US012705458B2

(12) United States Patent
Kwon et al.

(10) Patent No.: US 12,705,458 B2
(45) Date of Patent: Aug. 11, 2026

(54) DATA PROCESSING METHOD FOR RECURRENT NEURAL NETWORK USING NEURAL NETWORK ACCELERATOR BASED ON SYSTOLIC ARRAY AND NEURAL NETWORK ACCELERATOR

(71) Applicant: Electronics and Telecommunications Research Institute, Daejeon (KR)

(72) Inventors: Hyun Jeong Kwon, Daejeon (KR); Hyun Mi Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 913 days.

(21) Appl. No.: 18/077,111

(22) Filed: Dec. 7, 2022

(65) Prior Publication Data

US 2023/0177310 A1 Jun. 8, 2023

(30) Foreign Application Priority Data

Dec. 8, 2021 (KR) ........................ 10-2021-0174873
Nov. 17, 2022 (KR) ........................ 10-2022-0154210

(51) Int. Cl.
*G06N 3/0442* (2023.01)
*G06N 3/048* (2023.01)

(52) U.S. Cl.
CPC ........... *G06N 3/0442* (2023.01); *G06N 3/048* (2023.01)

(58) Field of Classification Search
CPC .... G06N 3/0442; G06N 3/0455; G06N 3/048; G06N 3/063
See application file for complete search history.

(56) References Cited

U.S. PATENT DOCUMENTS 10,459,876 B2 10/2019 Vantrease et al.
2019/0220739 A1 7/2019 Kwon et al.
2021/0312281 A1 10/2021 Kim

OTHER PUBLICATIONS

Chen et al., "Eyeriss: An Energy-Efficient Reconfigurable Accelerator for Deep Convolutional Neural Networks", Nov. 8, 2016, IEEE Journal of Solid-State Circuits, vol. 52, Issue: 1, pp. 127-138. (Year: 2016).*
Yasoubi et al., "Power-Efficient Accelerator Design for Neural Networks Using Computation Reuse", Jan. 26, 2016, IEEE Computer Architecture Letters, vol. 16, No. 1, pp. 72-75. (Year: 2016).*

* cited by examiner

*Primary Examiner* — Brent Johnston Hoover
(74) *Attorney, Agent, or Firm* — KILE PARK REED & HOUTTEMAN PLLC

(57) ABSTRACT

Proposed is a data parallel processing method for a recurrent neural network in a neural network accelerator based on a systolic array. A data processing device receives voice data of a user in a predetermined time section. The data processing device generates a plurality of voice data units by separating the voice data by sentence. The data processing device generates a plurality of input vectors by vectorizing the plurality of voice data units. The data processing device inputs the plurality of input vectors to a neural network accelerator based on a systolic array. In this manner, the data is processed.

10 Claims, 6 Drawing Sheets

DATA PROCESSING METHOD FOR RECURRENT NEURAL NETWORK USING NEURAL NETWORK ACCELERATOR BASED ON SYSTOLIC ARRAY AND NEURAL NETWORK ACCELERATOR

CROSS REFERENCE TO RELATED APPLICATION

This application claims priority to Korean Patent Application No. 10-2021-0174873, filed Dec. 8, 2021 and Korean Patent Application No. 10-2022-0154210, filed Nov. 17, 2022, the entire contents of which are incorporated herein for all purposes by this reference.

BACKGROUND OF THE INVENTION

Field of the Invention

The following description relates generally to a data parallel processing method for a recurrent neural network in a neural network accelerator based on a systolic array. In particular, the present disclosure relates to a data distribution method in a memory of a neural network accelerator.

Description of the Related Art

Artificial intelligence (AI) based operation (or computation) generally processes data according to an algorithm having a predetermined pattern. In this regard, AD-dedicated hardware has been developed. As a representative example, a neural network accelerator having a systolic array architecture optimized for matrix operation of input data reuse is used.

A representative neural network model processing time series data is a recurrent neural network (RNN) based model. The RNN-based model has limited ability to perform parallel processing, due to recurrent characteristics thereof using an operation result of a previous step. Thus, the neural network accelerator based on a systolic array of the related art is suitable for image processing having high inter-operation independency but not suitable for parallel processing of time series dependent data, such as voice data.

The foregoing is intended merely to aid in the understanding of the background of the present disclosure, and is not intended to mean that the present disclosure falls within the purview of the related art that is already known to those skilled in the art.

SUMMARY OF THE INVENTION

The following description is intended to propose a data processing method for processing time series data in parallel in a neural network accelerator based on a systolic array. The following description is also intended to propose a multiple placement processing method for voice data parallel processing in a neural network accelerator based on a systolic array.

In one general aspect, there is provided a voice data processing method including: receiving, by a data processing device, voice data of a user in a predetermined time section; generating, by the data processing device, a plurality of voice data units by dividing the voice data by sentence; generating, by the data processing device, a plurality of input vectors by vectorizing the plurality of voice data units; and inputting, by the data processing device, the plurality of input vectors to a neural network accelerator based on a systolic array so as to process the data. The neural network accelerator may place the plurality of input vectors in a plurality of lines of a memory, distribute a single weight matrix to the plurality of lines, apply weight tiles in a single line of the weight matrix to the plurality of input vectors, respectively, and place intermediate vectors generated by the application of the weight tiles to the plurality of input vectors in same lines as the input vectors used in operation, respectively.

In another aspect, there is a data processing method including: receiving, by a data processing device, data in a predetermined time section; separating, by the data processing device, the data into data units having an equal length; generating, by the data processing device, a plurality of input vectors by vectorizing the data units; and inputting, by the data processing device, the plurality of input vectors to a neural network accelerator based on a systolic array so as to process the data. The neural network accelerator may place the plurality of input vectors in a plurality of lines of a memory, distribute a single weight matrix to the plurality of lines, apply weight tiles in a single line of the weight matrix to the plurality of input vectors, respectively, and place intermediate vectors generated by the application of the weight tiles to the plurality of input vectors in same lines as the input vectors used in operation, respectively.

According to another aspect of the present disclosure, provided is a neural network accelerator based on a systolic array, the accelerator including: a processing element array including a plurality of processing elements; a memory; and a controller configured to generate intermediate vectors from each of a plurality of input vectors stored in the memory and a weight matrix using the processing element array and control an internal operation of a neural network to be performed for the intermediate vector. The controller may place the plurality of input vectors in a plurality of lines of a memory, distribute a single weight matrix to the plurality of lines, apply weight tiles in a single line of the weight matrix to the plurality of input vectors, respectively, and place intermediate vectors generated by the application of the weight tiles to the plurality of input vectors in same lines as the input vectors used in operation, respectively. The plurality of input vectors may be obtained by parallel-processing time series data which is vectorized information of the plurality of data units generated by separating source data of a predetermined time section to be analyzed into equal sizes.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
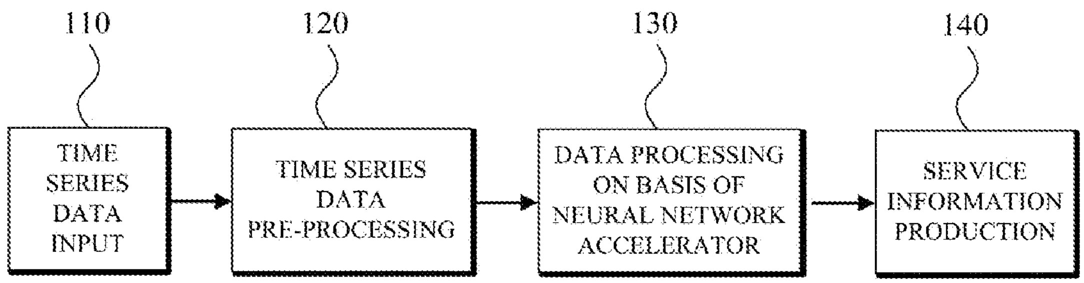
FIG. 1 is a schematic block diagram illustrating an example of a data service providing process using a neural network accelerator.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The technologies described below relate to a data processing or operating method in a neural network accelerator based on a systolic array. Hereinafter, the neural network accelerator refers to a parallel processing accelerator having a systolic array-based architecture.

The technologies described below relate to a data processing or operating method in a neural network accelerator in a neural network accelerator suitable for time series data.

Time series data refers to data having characteristics in which data in a step is influenced by data in a previous process on the time axis. A representative example of time series data includes voice data. In the following description, voice data will be mainly described. However, it should be understood that the following description is not only applied to voice data but is applicable to various types of data having time series characteristics.

In addition, the technologies described below relate to a data processing or operating method in a neural network model, such as a recurrent neural network (RNN), having recurrent characteristics.

Furthermore, the technologies described below relate to a neural network accelerator capable of parallel processing of time series data.

In the following description, it will be assumed that a neural network for services, such as voice recognition, has been constructed (or trained) in advance. Thus, in the following description, descriptions of a learning process and an inference process of the neural network will be omitted.

Hereinafter, a unit that processes data using the neural network accelerator will be referred to as a data processing device. The data processing device may perform the inference process using the neural network accelerator. The data processing device may be implemented as a computing device, a personal computer (PC), a smart device, a server on a network, a chipset in which a program is embedded, or the like. In addition, the data processing device may be a service device that provides a service using the trained neural network.

FIG. 1 is a schematic block diagram illustrating an example of a data service providing process 100 using a neural network accelerator.

The data processing device receives time series data to be analyzed in 110. For example, the time series data may include voice data.

The data processing device may uniformly perform pre-processing for the input time series data in 120. The pre-processing may include a process of uniformly separating the time series data. In the pre-processing, the data processing device may separate the time series data into a plurality of data units. Here, the plurality of data units may be comprised of data having the same length. The plurality of data units may be comprised of data having different lengths. The data processing device may convert the plurality of data units into predetermined vectors.

The data processing device uniformly processes data by inputting the plurality of vectors to the neural network accelerator in 130. Data processing in the neural network accelerator will be described later.

The data processing device may produce predetermined service information on the basis of an output value of the neural network accelerator. The service information may be one of various pieces of information according to the neural network constructed in advance and services to be provided. For example, when the service is a voice, the output service information may be text corresponding to or extracted from the voice.

FIG. 1 illustrates a process of processing time series data in a predetermined section. The data processing device may repeat a process of processing time series data in a predetermined section and a process of not processing time series data in a next section.

Figure 2:
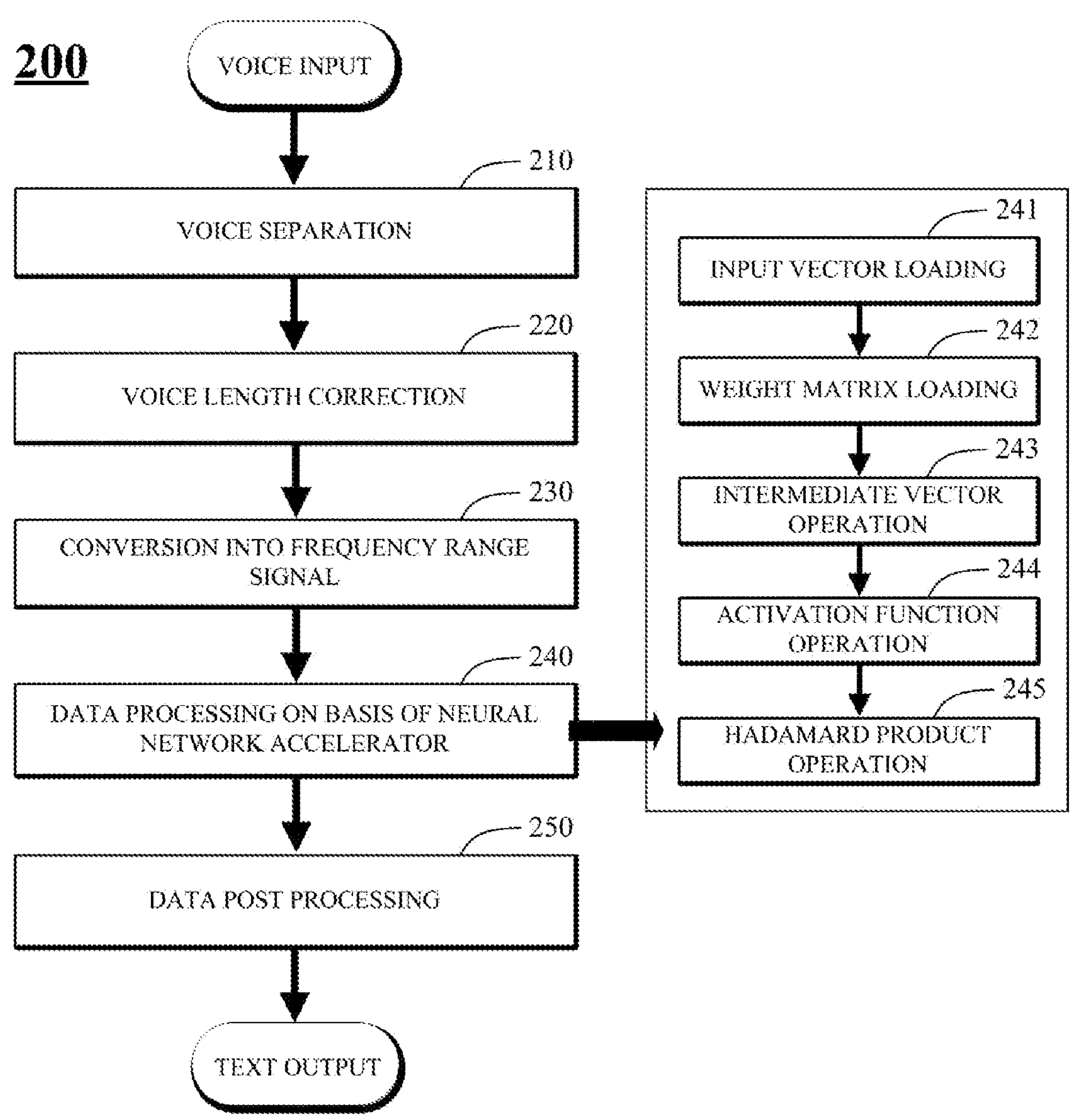
FIG. 2 is a diagram illustrating an example of a voice recognition process using the neural network accelerator.

FIG. 2 is a diagram illustrating an example of a voice recognition process 200 using the neural network accelerator. FIG. 2 illustrates an example of a process of performing a voice recognition application using the neural network accelerator.

The data processing device receives voice data of a user.

The data processing device separates voice in a predetermined section into a plurality of units in 210. For example, the data processing device may separate the input voice by the sentence. Variety of commonly known technologies may be used to separate a series of voices into predetermined units. The data processing device generates a plurality of voice data units.

The data processing device may the correct the plurality of separated voice data units to have the same voice length in 220. This is intended to make vectors input to the neural network have the same size.

The process of separating voice according to a predetermined standard and correcting separated voice units to have the same length may enable pieces of time series data to have operation independency and parallel processing to be performed.

The data processing device may convert a voice signal into a frequency range signal in 230.

The 210 to 230 steps may be pre-processing for time series data.

The data processing device may process pre-processed data in parallel using the neural network accelerator in 240. The data processing device may generate input vectors by uniformly vectorizing signals separated by the sentence. The data processing device loads a plurality of input vectors of the series of voices to a memory of the neural network accelerator in 241. The data processing device loads a weight matrix to the memory in 242. The weight matrix may be information set through a learning process. The weight matrix may be a matrix to be commonly used to input vectors. The data processing device performs operation to generate intermediate vectors by applying the weight matrix to the input vectors in 243. The data processing device may perform activation function operation for intermediate vectors in 244. Types of activation function are determined according to the constructed model. Tan h and sigmoid activation functions may be used in a long short-term memory model for natural language processing. A variety of activation functions (e.g., softmax, ReLU, etc.) may be used according to the type of neural network and the class of neural network. The data processing device may perform Hadamard product operation for the result of the intermediate vector operation and the result of the activation function operation in 245. The intermediate vector operation, the activation function operation, and the Hadamard product operation may be a series of operations performed in a long short-term memory (LSTM).

Furthermore, when data processing using the neural network accelerator for the series of voices is completed, the data processing device may perform post processing to convert the data into text in 250.

FIG. 2 illustrates an example of voice recognition. For example, a natural language processing model to which text is input may process data using a similar process. The data processing device may separate a predetermined section of text by the sentence, and generate plurality of tokens. The data processing device may perform parallel processing by inputting the plurality of tokens to the neural network accelerator.

Figure 3:
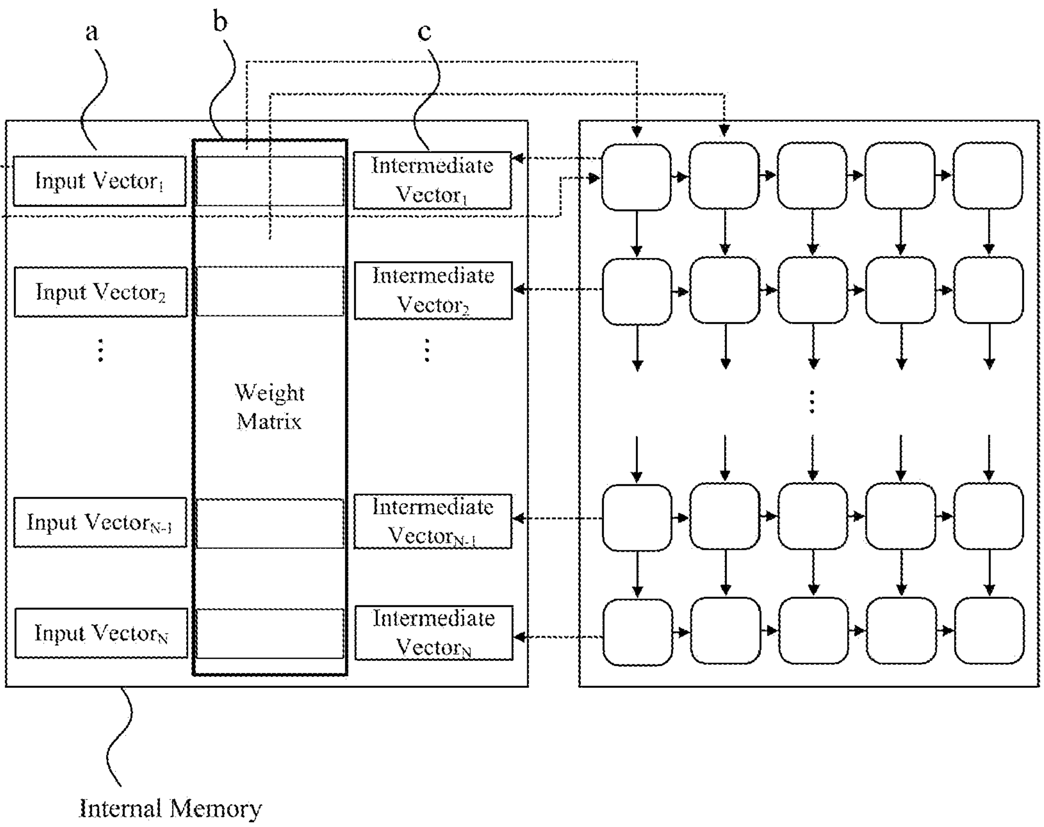
FIG. 3 is a diagram illustrating an example of data placement in the memory of the neural network accelerator.

FIG. 3 is a diagram illustrating an example of data placement in the memory of the neural network accelerator. FIG. 3 is an example of the data placement for parallel processing of data, such as voice, in a systolic array.

The left part in FIG. 3 illustrates data placed in an internal memory of the neural network accelerator. Referring to FIG. 3, the data placed in the internal memory includes N number of input vectors a placed in N number of lines (e.g., columns or rows) and a single weight matrix b distributed to N number of lines.

The neural network accelerator performs an operation, by a processor, using the weight matrix common to input vectors of respective lines, thereby generating intermediate vectors. The internal memory stores intermediate vectors c for the input vectors of respective lines in the same lines as the input vectors.

Figure 4:
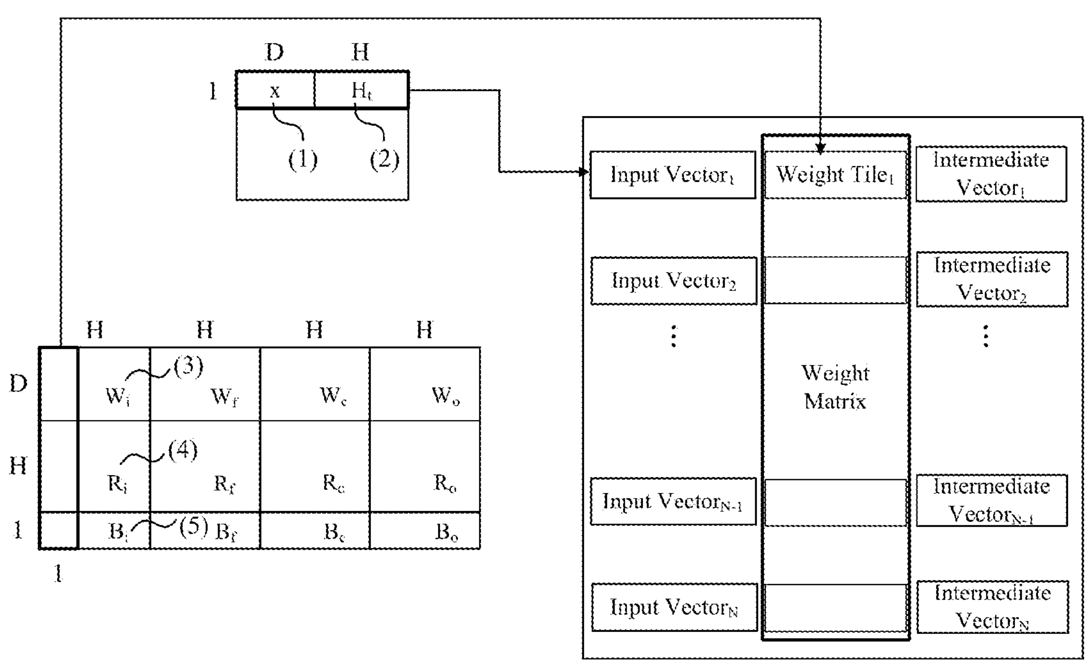
FIG. 4 is a diagram illustrating an example of placement of input vectors and a weight matrix in the memory of the neural network accelerator.

FIG. 4 is a diagram illustrating an example of placement of input vectors and a weight matrix in the memory of the neural network accelerator. In FIG. 4, accelerator processing for voice data will be described as an example. In FIG. 4, D and H refer to sizes (i.e., lengths) of corresponding memory fields.

Each of the input vector has a form in which x 1 as a result of pre-processing for input voice and $H_t$ 2 initialized to a zero vector are connected.

The weight matrix is a matrix comprised of a plurality of rows and lines common to input vectors. The weight matrix is separated into 4H number of tiles, which are distributed to lines of the internal memory. In the weight matrix, weight $tile_1$ of the weight matrix participates in operation of single input $vector_1$. The weight matrix is comprised of W 3, R 4, and B 5.

In addition, the neural network accelerator may use double buffering in consideration of a delay time taken for data movement between an external memory and the internal memory.

Figure 5A:
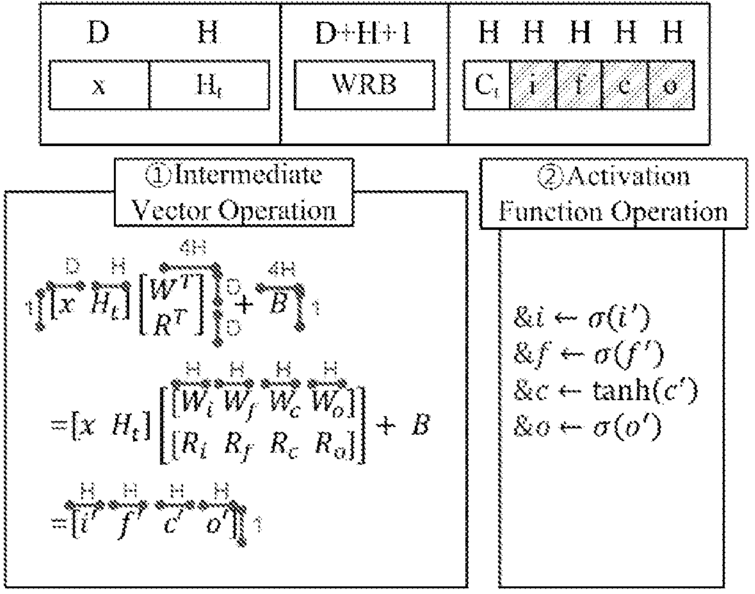
FIGS. 5A and 5B are diagrams illustrating an example of a data operating process of a recurrent neural network in the neural network accelerator.
Figure 5B:
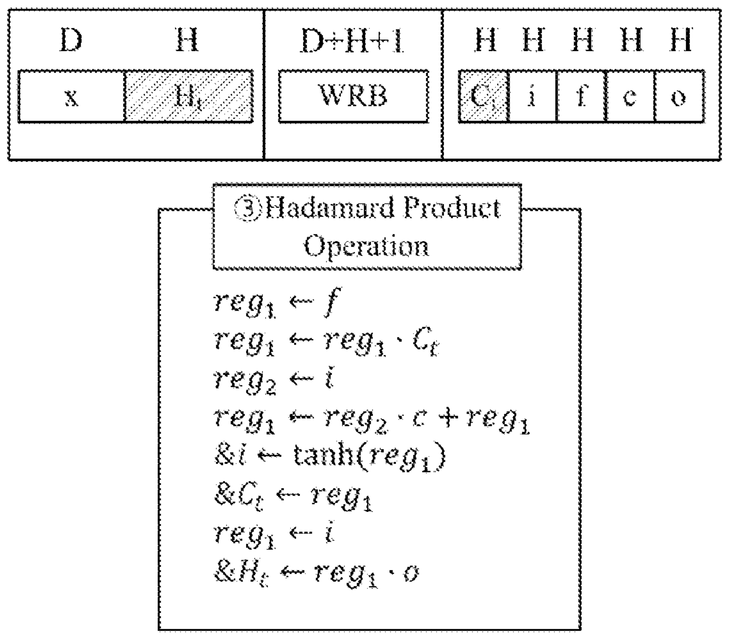

FIGS. 5A and 5B are diagrams illustrating an example of a data operating process of a recurrent neural network in the neural network accelerator. FIGS. 5A and 5B illustrate an example of a process of performing LSTM operation using data stored in the memory of the neural network accelerator.

FIG. 5A illustrates an example of a process of intermediate vector operation and activation function operation. The neural network accelerator generates a single component of an intermediate vector (i, f, c, o) by multiplying a W component of a weight matrix by an x vector of input vectors, multiplying an R component of the weight matrix by $H_t$ of input vectors, and adding a bias B to a resultant value (① operation of intermediate vector). The neural network accelerator performs operation of an activation function, such as sigmoid and tan h, to the intermediate vector (② operation of activation function). Shadowed components in FIG. 5A indicate result data of the operation, including the operation of the activation function.

The neural network accelerator performs intermediate vector operation and activation function operation for the input data by the number of lines of the internal memory. Afterwards, the neural network accelerator performs Hadamard product operation. FIG. 5B illustrates an example process of Hadamard product operation. The neural network accelerator generates final results $C_t$ and $H_t$ by performing Hadamard product operation using operated intermediate vector values and stores $C_t$ and $H_t$ in the memory (③ Hadamard product operation). The operation results $C_t$ and $H_t$ are used in operation of input data of a next t. $C_t$ indicates a cell state also referred to as a long term state in the LSTM.

By placing the input vectors, the weight matrix, and the intermediate vectors in the memory as described above, the neural network accelerator may exclude inter-operation dependency by continuously performing operations while sharing weights by performing operations.

Figure 6:
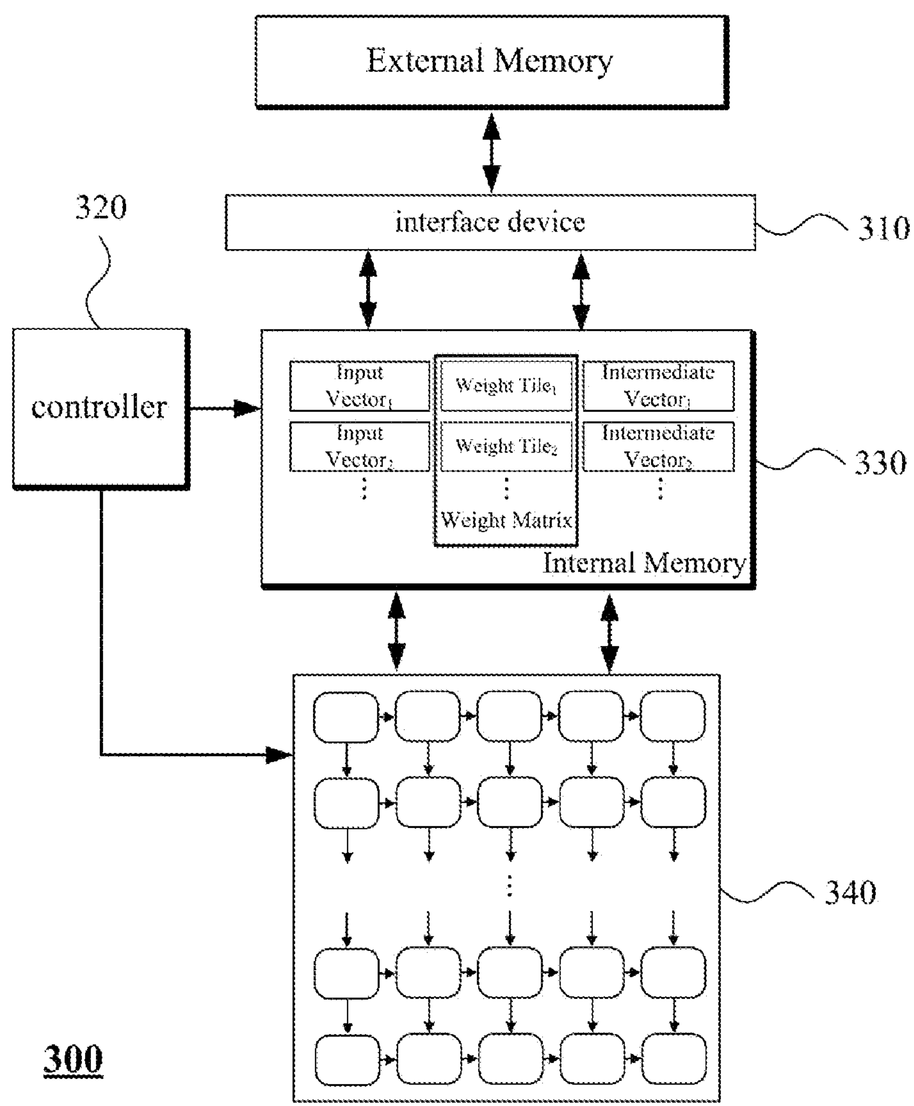
FIG. 6 is a diagram illustrating an example of a neural network accelerator based on a systolic array.

FIG. 6 is a diagram illustrating an example of a neural network accelerator 300 based on a systolic array. FIG. 6 corresponds to a neural network accelerator using the method of distributing data to the internal memory and the data processing method as described above. The neural network accelerator 300 includes an interface device 310, a controller 320, an internal memory 330, and a processing element array 340.

In FIG. 6, an external memory may store a plurality of input vectors generated by the data processing device having uniformly processed input data. Here, the input vectors may be vectors generated after source data is separated into a plurality of data units having a predetermined size. The source data may be time series data such as voice data. The above-described data processing device may have a configuration including an external memory, a processor performing data pre-processing, and the neural network accelerator 300.

The interface device 310 is a device that receives instructions and data from an external source. The interface device 310 may receive input vectors from a physically connected input device or an external memory. The interface device 310 may transfer the input vectors to the internal memory 330. Although not shown, the interface device 310 may store a result processed by the processing element array 340 in the internal memory or transfer the result to an external memory.

The controller 320 controls data processing and operations in the neural network accelerator 300.

The internal memory 330 stores data for processing data according to the architecture of the neural network.

The controller 320 may perform control so that the input vectors, the weight matrix, and the intermediate vectors placed as illustrated in FIGS. 3 and 4 are stored in the internal memory 330. The controller 320 may place the plurality of input vectors in a plurality of lines of the internal memory 330, distribute the single weight matrix to the plurality of input vectors, and place the intermediate vectors generated by application of weight tiles to the plurality of input vectors, respectively, in the same lines as the input vectors used in the operation.

As illustrated in FIGS. 5A and 5B, the controller 320 may produce an intermediate vector for an input vector for each of the plurality of input vectors by controlling the internal memory 310 and the processing element array 340. That is, the controller 320 may calculate the intermediate vector for the input vector using the input vector and a weight component (i.e., a weight tile) used in operation with the input vector among weight components of the weight matrix. The controller 320 may perform control so that the input vector for each of the plurality of input vectors, the weight component (i.e. a weight tile) used in operation with the input vector, and the intermediate vector for the input vector to be stored in the same line in the internal memory 330.

In addition, as illustrated in FIGS. 5A and 5B, the controller 320 may perform an internal operation of an additional neural network for the produced intermediate vector. For example, the controller 320 may control the processing element array 340 to perform a series of LSTM operations by applying an activation function to each of the intermediate vectors and performing the Hadamard product operation to the result obtained by the application of the activation function.

The processing element array 340 may be a systolic array-based parallel processor.

In addition, the data processing method of the neural network accelerator, the data placement method in the memory of the neural network accelerator, and the operating method using data placed in the memory of the neural network accelerator as described above may be implemented as a program (or an application) including an executable algorithm that may be executed in a computer. The program may be stored in a transitory computer readable medium or a non-transitory computer readable medium.

The non-transitory computer readable medium refers to a medium that stores data semi-permanently and is readable by devices, rather than a medium, such as a register, cash, and a memory, which stores data temporarily. More specifically, the above-described various applications or programs may be stored in the non-transitory computer readable medium, such as a compact disc (CD), a digital video disc (DVD), a hard disk, a Blu-ray disk, a universal serial bus (USB) memory, a memory card, read-only memory (ROM), programmable read only memory (PROM), erasable PROM (EPROM), electrically erasable PROM (EEPROM), or flash memory.

The transitory computer readable medium refers to various types of RAM, such as static RAM (SRAM), dynamic RAM (RAM), synchronous DRAM (SDRAM), double data rate SDRAM (DDR SDRAM), enhanced SDRAM (ESDRAM), synchronous-link DRAM (SLDRAM), and direct Rambus RAM (DRRAM).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A voice data processing method comprising:

receiving, by a data processing device, voice data of a user in a predetermined time section;

generating, by the data processing device, a plurality of voice data units by separating the voice data by sentence;

generating, by the data processing device, a plurality of input vectors by vectorizing the plurality of voice data units; and inputting, by the data processing device, the plurality of input vectors to a neural network accelerator based on a systolic array so as to process the plurality of input vectors, wherein the neural network accelerator places the plurality of input vectors in a plurality of lines of a memory, distributes a single weight matrix to the plurality of lines, applies weight tiles in a single line of the weight matrix to the plurality of input vectors, respectively, and places intermediate vectors generated by the application of the weight tiles to the plurality of input vectors in same lines as the input vectors used in operation, respectively.

2. The method according to claim 1, further comprising correcting, by the data processing device, the plurality of voice data units to have an equal length.

3. The method according to claim 1, wherein a first input vector placed in a first line of the memory among the plurality of input vectors, a weight component used in operation with the first input vector among weight components of the weight matrix, and a first intermediate vector generated by applying the weight component to the first input vector are continuously stored in the first line of the memory by the neural network accelerator.

4. The method according to claim 3, wherein the neural network accelerator performs a long short-term memory (LSTM) operation by applying an activation function to the first intermediate vector and operating an Hadamard product to a result of the application of the activation function to the first intermediate vector.

5. A data processing method comprising:

receiving, by a data processing device, data in a predetermined time section;

separating, by the data processing device, the data into data units having an equal length;

generating, by the data processing device, a plurality of input vectors by vectorizing the data units; and inputting, by the data processing device, the plurality of input vectors to a neural network accelerator based on a systolic array so as to process the data, wherein the neural network accelerator places the plurality of input vectors in a plurality of lines of a memory, distributes a single weight matrix to the plurality of lines, applies weight tiles in a single line of the weight matrix to the plurality of input vectors, respectively, and places intermediate vectors generated by the application of the weight tiles to the plurality of input vectors in same lines as the input vectors used in operation, respectively.

6. The method according to claim 5, wherein an input vector among the plurality of input vectors, a weight component used in operation with the input vector among weight components of the weight matrix, and an intermediate vector generated by applying the weight component to the input vector are continuously stored in a single line of the memory by the neural network accelerator.

7. A neural network accelerator based on a systolic array, the accelerator comprising:

a processing element array comprising a plurality of processing elements;

a memory; and a controller configured to generate intermediate vectors from each of a plurality of input vectors stored in the memory and a weight matrix using the processing element array and control an internal operation of a neural network to be performed for the intermediate vector, wherein the controller places the plurality of input vectors in a plurality of lines of a memory, distributes a single weight matrix to the plurality of lines, applies weight tiles in a single line of the weight matrix to the plurality of input vectors, respectively, and places intermediate vectors generated by the application of the weight tiles to the plurality of input vectors in same lines as the input vectors used in operation, respectively, and the plurality of input vectors are obtained by parallel-processing time series data which is vectorized information of the plurality of data units generated by separating source data of a predetermined time section to be analyzed into equal sizes.

8. The neural network accelerator according to claim 7, wherein an input vector of each of the plurality of input vectors, a weight component used in operation with the input vector among weight components of the weight matrix, and an intermediate vector generated by applying the weight component to the input vector are continuously stored in a single line of the memory.

9. The neural network accelerator according to claim 7, wherein the controller controls the processing element array to perform a series of long short-term memory (LSTM) operations by applying an activation function to each of the intermediate vectors and performing an Hadamard product operation to a result obtained by the application of the activation function.

10. The neural network accelerator according to claim 7, wherein the source data is time series data comprising voice data.

* * * * *